United States Patent
Suh et al.

(10) Patent No.: US 9,693,113 B2
(45) Date of Patent: *Jun. 27, 2017

(54) METHOD OF PROCESSING NON-REAL TIME SERVICE AND BROADCAST RECEIVER

(71) Applicant: LG Electronics, Seoul (KR)

(72) Inventors: Jong Yeul Suh, Pyeongtaek-si (KR); Thomas Gomer, Arlington, WA (US); Jae Hyung Song, Seoul (KR); Jin Phil Kim, Seoul (KR); Ho Taek Hong, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 677 days.

This patent is subject to a terminal disclaimer.

(21) Appl. No.: 13/846,449

(22) Filed: Mar. 18, 2013

(65) Prior Publication Data

US 2013/0247119 A1    Sep. 19, 2013

Related U.S. Application Data

(63) Continuation of application No. 12/654,080, filed on Dec. 9, 2009, now Pat. No. 8,549,566.

(Continued)

(51) Int. Cl.
*H04N 7/20* (2006.01)
*H04N 21/654* (2011.01)
(Continued)

(52) U.S. Cl.
CPC ....... *H04N 21/654* (2013.01); *H04N 7/17318* (2013.01); *H04N 21/235* (2013.01);
(Continued)

(58) Field of Classification Search
CPC ............ H04N 7/17318; H04N 21/235; H04N 21/435; H04N 7/165; H04N 7/173
(Continued)

(56) References Cited

U.S. PATENT DOCUMENTS 8,009,752 B2 * 8/2011 Casaccia ............... H04L 1/0045
375/267
2006/0059267 A1   3/2006 Cugi et al.
(Continued)

FOREIGN PATENT DOCUMENTS

KR   10-2006-0116032   11/2006
KR   10-2007-0031459    3/2007
(Continued)

*Primary Examiner* — Jason Salce
(74) *Attorney, Agent, or Firm* — Dentons US LLP

(57) ABSTRACT

A method of receiving and processing a Non-Real Time (NRT) service and a broadcast receiver are disclosed herein. A method of processing an NRT service in a broadcast receiver includes receiving and processing a signaling information table including detail information of each content in the NRT service and indication information indicating whether the content is available on internet, acquiring internet access information of each file belonging to content available on the internet through File Delivery Table (FDT) of File Delivery over Unidirection Transport (FLUTE) based on the indication information, and downloading files belonging to the content by accessing the internet based on the acquired internet access information.

16 Claims, 25 Drawing Sheets

Related U.S. Application Data

(60) Provisional application No. 61/121,178, filed on Dec. 9, 2008, provisional application No. 61/121,181, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/169,711, filed on Apr. 15, 2009, provisional application No. 61/179,005, filed on May 17, 2009, provisional application No. 61/226,259, filed on Jul. 16, 2009, provisional application No. 61/255,844, filed on Oct. 28, 2009.

(51) Int. Cl.
| | |
|---|---|
| *H04N 7/173* | (2011.01) |
| *H04N 21/235* | (2011.01) |
| *H04N 21/434* | (2011.01) |
| *H04N 21/435* | (2011.01) |
| *H04N 21/458* | (2011.01) |
| *H04N 21/462* | (2011.01) |
| *H04N 21/482* | (2011.01) |
| *H04N 21/84* | (2011.01) |

(52) U.S. Cl.
CPC ....... *H04N 21/435* (2013.01); *H04N 21/4348* (2013.01); *H04N 21/4586* (2013.01); *H04N 21/4622* (2013.01); *H04N 21/482* (2013.01); *H04N 21/84* (2013.01)

(58) Field of Classification Search
USPC .... 725/32, 34, 67–68, 70–71, 116, 138–139, 725/146, 151; 370/312, 395.52, 432; 348/731, 426.1, 384.1; 709/217, 227, 229
See application file for complete search history.

(56) References Cited

U.S. PATENT DOCUMENTS

| | | | |
|---|---|---|---|
| 2006/0193337 | A1 | 8/2006 | Paila et al. |
| 2007/0101352 | A1 | 5/2007 | Rabina et al. |
| 2009/0077585 | A1 | 3/2009 | Singhai et al. |
| 2009/0138932 | A1 | 5/2009 | Bauchot et al. |
| 2010/0309387 | A1 | 12/2010 | Eyer |
| 2011/0004908 | A1* | 1/2011 | Eyer .................. H04N 21/235 725/56 |

FOREIGN PATENT DOCUMENTS

| | | |
|---|---|---|
| KR | 10-2007-0097185 A | 10/2007 |
| KR | 10-0848273 B1 | 7/2008 |

* cited by examiner

FIG. 4

| Syntax | No. of Bits | Format |
|---|---|---|
| virtual_channel_table_section(){ | | |
|   table_id | 8 | 0xC8 |
|   section_syntax_indicator | 1 | '1' |
|   Private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for(i=0;i<num_channels_in_section;i++){ | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for(i=0;i<N;i++){ | | |
|       descriptor() | | |
|     } | | |
|   } | | |
|   reserved | 6 | '111111' |
|   additional_descriptors_length | 10 | uimsbf |
|   for(j=0;j<N;j++){ | | |
|     additional_descriptor() | | |
|   } | | |
|   CRC_32 | 32 | rpchof |
| } | | |

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| data_service_table_bytes() { | | |
|     sdf_protocol_version | 8 | uimsbf |
|     application_count_in_section | 8 | uimsbf |
|     if(application_count_in_section > 0) { | | |
|         for(j = 0; j <application_count_in_section; j++) { | | |
|         compatibility_descriptor() | | |
|         app_id_byte_length | 16 | uimsbf |
|         if(app_id_byte_length > 1) { | | |
|           app_id_description | 16 | uimsbf |
|           for(i=0;i<app_id_byte_length-2;i++) { | | |
|             app_id_byte | 8 | bslbf |
|           } | | |
|         } | | |
|         tap_count | 8 | uimsbf |
|         for(i=0;i<tap_count; i++) { | | |
|           protocol_encapsulation | 8 | uimsbf |
|           action_type | 7 | uimsbf |
|           resource_location | 1 | bslbf |
|           Tap() | | |
|           tap_info_length | 16 | uimsbf |
|           for(k=0; k<N; k++) { | | |
|             descriptor() | | |
|           } | | |
|         } | | |
|         app_info_length | 16 | uimsbf |
|         for(i=0; i<M; i++) { | | |
|           descriptor() | | |
|         } | | |
|         app_data_length | 16 | uimsbf |
|         for(i=0; i<app_data_length; i++) { | | |
|           app_data_byte | 8 | bslbf |
|         } | | |
|         } | | |
|     } | | |
|     service_info_length | 16 | uimsbf |
|     for(j=0; j<K; j++) | | |
|       descriptor() | | |
|     } | | |
|     service_private_data_length | 16 | uimsbf |
|     for(j=0; j<service_private_data_length; j++){ | | |
|       service_private_data_byte | 8 | bslbf |
|     } | | |
| } | | |

FIG. 10

| Syntax | No.of Bits | Format |
|---|---|---|
| NRT_service_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | '11111111' |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     num_NRT_services | 8 | uimsbf |
|     for (j=0;j< num_NRT_services; j++) | | |
|     { | | |
|         NRT_service_id | 16 | uimsbf |
|         reserved | 2 | '11' |
|         NRT_service_status | 2 | uimsbf |
|         SP_indicator | 1 | bslbf |
|         short_NRT_service_name_length /* m */ | 3 | uimsbf |
|         short_NRT_service_name | 16*m | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination_IP_address_flag) | | |
|             NRT_service_destination_IP_address | 32 or 128 | uimsbf |
|         for (j=0;j< num_components; j++) | | |
|         { | | |
|             reserved | 1 | '1' |
|             essential_component_indicator | 1 | bslbf |
|             component_destination_IP_address_flag | 1 | bslbf |
|             port_num_count | 5 | uimsbf |
|             component_destination_UDP_port_num | 16 | uimsbf |
|             if (component_destination_IP_address_flag) | | |
|                 component_destination_IP_address | 32 or 128 | uimsbf |
|             reserved | 4 | '1111' |

FIG. 11

| | | |
|---|---|---|
| num_component_level_descriptors<br>for (k=0;k< num_components_level_descriptors; k++)<br>{<br>    component_level_descriptor()<br>}<br>}<br>reserved<br>num_NRT_service_level_descriptors<br>for (m=0; m<num_NRT_service_level_descriptors; m++)<br>{<br>    NRT_service_level_descriptor()<br>}<br>}<br>reserved<br>num_virtual_channel_level_descriptors<br>for (n=0; n<num_virtual_channel_level_descriptors; n++) {<br>    virtual_channel_level_descriptor()<br>}<br>} | 4<br><br>var<br><br><br>4<br>4<br><br><br>var<br><br><br>4<br>4<br><br><br>var | uimsbf<br><br><br><br><br>'1111'<br>uimsbf<br><br><br><br><br><br>'1111'<br>uimsbf<br><br><br><br> |

FIG. 12

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if(component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 13

| Syntax | No.of Bits | Format |
|---|---|---|
| NRT_component_data() { | | |
|   TSI | 16 | uimsbf |
|   session_start_time | 32 | uimsbf |
|   session_end_time | 32 | uimsbf |
|   reserved | 5 | '11111' |
|   tias_bandwidth_indicator | 1 | bslbf |
|   as_bandwidth_indicator | 1 | bslbf |
|   FEC_OTI_indicator | 1 | bslbf |
|   if (tias_bandwidth_indicator == '1') { | | |
|     tias_bandwidth | 16 | uimsbf |
|   } | | |
|   if (as_bandwidth_indicator == '1') { | | |
|     as_bandwidth | 16 | uimsbf |
|   } | | |
|   if (FEC_OTI_indicator == '1') { | | |
|     FEC_encoding_id | 8 | uimsbf |
|     FEC_instance_id | 16 | uimsbf |
|   } | | |
| } | | |

FIG. 14

| Syntax | No. of Bits | Format |
|---|---|---|
| NRT_information_table_section() { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
|    content_linkage | 32 | uimsbf |
|    updates_available | 1 | bslbf |
|    TF_available | 1 | bslbf |
|    available_on_internet | 1 | bslbf |
|    low_latency | 1 | bslbf |
|    playback_length_in_seconds | 20 | uimsbf |
|    content_length_included | 1 | bslbf |
|    playback_delay_included | 1 | bslbf |
|    expiration_included | 1 | bslbf |
|    reserved | 1 | '1' |
|    duration | 12 | uimsbf |

FIG. 15

```
        if (content_length_included==1) {
            content_length                          40      uimsbf
        }
        if (playback_delay_included==1) {
            reserved                                 4      '1111'
            playback_delay                          20      uimsbf
        }
        if (expiration_included==1) {
            expiration                              32      uimsbf
        }
        content_name_length                          8      uimsbf
        content_name_text()                         var
        reserved                                     4      '1111'
        content_descriptors_length                  12      uimsbf
        for (i=0; i<N; i++) {
            content_descriptor()
        }
    }
    reserved                                         6      '111111'
    descriptors_length                              10      uimsbf
    for (i=0; i<M; i++) {
        descriptor()
    }
}
```

FIG. 16

```
<?xml version="1.0" encoding="UTF-8"?>
<xs:schema xmlns=" http://www.atsc.org/XMLSchemas/nrt/flute/fdt/1.0"
 xmlns:xs="http://www.w3.org/2001/XMLSchema" targetNamespace =
"http://www.atsc.org/XMLSchemas/nrt/flute/fdt/1.0" elementFormDefault="qualified">
 <xs:element name="FDT-Instance" type="FDT-InstanceType"/>
 <xs:complexType name="FDT-InstanceType">
  <xs:sequence>
   <xs:element name="File" type="File-Type" maxOccurs="unbounded"/>
   <xs:element name="FDT-Content-Linkage" type="xs:unsignedInt" minOccurs="0" maxOccurs="unbounded"/>   ①
   <xs:any namespace="##other" processContents="skip" minOccurs="0" maxOccurs="unbounded"/>
  </xs:sequence>
  <xs:attribute name="Expires" type="xs:string" use="required"/>
  <xs:attribute name="Complete" type="xs:boolean" use="optional"/>
  <xs:attribute name="Content-Type" type="xs:string" use="optional"/>
  <xs:attribute name="Content-Encoding" type="xs:string" use="optional"/>
  <xs:attribute name="FEC-OTI-FEC-Encoding-ID" type="xs:unsignedLong" use="optional"/>
  <xs:attribute name="FEC-OTI-FEC-Instance-ID" type="xs:unsignedLong" use="optional"/>
  <xs:attribute name="FEC-OTI-Maximum-Source-Block-Length" type="xs:unsignedLong" use="optional"/>
  <xs:attribute name="FEC-OTI-Encoding-Symbol-Length" type="xs:unsignedLong" use="optional"/>
  <xs:attribute name="FEC-OTI-Max-Number-of-Encoding-Symbols" type="xs:unsignedLong" use="optional"/>
  <xs:attribute name="FEC-OTI-Scheme-Specific-Info" type="xs:base64Binary" use="optional"/>
  <xs:anyAttribute processContents="skip"/>
 </xs:complexType>
 <xs:complexType name="File-Type">
  <xs:sequence>
   <xs:element name="File-Content-Linkage" type="Content-Linkage-Type" minOccurs="0" maxOccurs="unbounded"/>   ②
   <xs:any namespace="##other" processContents="skip" minOccurs="0" maxOccurs="unbounded"/>
  </xs:sequence>
```

FIG. 17

```
<xs:attribute name="Content-Location" type="xs:anyURI" use="required"/>  ④
<xs:attribute name="TOI" type="xs:positiveInteger" use="required"/>
<xs:attribute name="Content-Length" type="xs:unsignedLong" use="required"/>
<xs:attribute name="Transfer-Length" type="xs:unsignedLong" use="optional"/>
<xs:attribute name="Content-Type" type="xs:string" use="optional"/>
<xs:attribute name="Content-Encoding" type="xs:string" use="optional"/>
<xs:attribute name="Content-MD5" type="xs:base64Binary" use="optional"/>
<xs:attribute name="FEC-OTI-FEC-Encoding-ID" type="xs:unsignedLong" use="optional"/>
<xs:attribute name="FEC-OTI-FEC-Instance-ID" type="xs:unsignedLong" use="optional"/>
<xs:attribute name="FEC-OTI-Maximum-Source-Block-Length" type="xs:unsignedLong" use="optional"/>
<xs:attribute name="FEC-OTI-Encoding-Symbol-Length" type="xs:unsignedLong" use="optional"/>
<xs:attribute name="FEC-OTI-Max-Number-of-Encoding-Symbols" type="xs:unsignedLong" use="optional"/>
<xs:attribute name="FEC-OTI-Scheme-Specific-Info" type="xs:base64Binary" use="optional"/>
<xs:anyAttribute processContents="skip"/>
</xs:complexType>
<xs:complexType name="Content-Linkage-Type">
<xs:simpleContent>
<xs:extension base="xs:unsignedInt">
<xs:attribute name="entry" type="xs:boolean" use="optional" default="false"/>  ③
<xs:anyAttribute processContents="skip"/>
</xs:extension>
</xs:simpleContent>
</xs:complexType>
</xs:schema>
```

FIG. 18

| NRT Service Guide | | | |
|---|---|---|---|
| 12/1 | 6:00 | 7:00 | 8:00 |
| KBS | | Content Item 1 | |
| MBC | Content Item 2 [Internet] | Content Item 3 | |
| SBS | Content Item 4 | | |

(a)

Do you want to download content item 2 through the internet?

| Yes | No |

| Syntax | No. of Bits | Format |
|---|---|---|
| NRT_information_table_section() { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
|    content_linkage | 32 | uimsbf |
|    updates_available | 1 | bslbf |
|    TF_available | 1 | bslbf |
|    low_latency | 1 | bslbf |
|    available_on_internet | 2 | uimsbf |
|    playback_length_in_seconds | 20 | uimsbf |
|    content_length_included | 1 | bslbf |
|    playback_delay_included | 1 | bslbf |
|    expiration_included | 1 | bslbf |
|    duration | 12 | uimsbf |

FIG. 21

| | | |
|---|---|---|
| if (content_length_included==1) { | | |
|     content_length | 40 | uimsbf |
| } | | |
| if (playback_delay_included==1) { | | |
|     reserved | 4 | '1111' |
|     playback_delay | 20 | uimsbf |
| } | | |
| if (expiration_included==1) { | | |
|     expiration | 32 | uimsbf |
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
|     content_descriptor() | | |
|     } | | |
| } | | |
| reserved | 6 | '111111' |
| descriptors_length | 10 | uimsbf |
| for (i=0; i<M; i++) { | | |
|     descriptor() | | |
|     } | | |
| } | | |

FIG. 22

| available_on_internet | Meaining |
|---|---|
| 00 | No files available through internet access |
| 01 | Some files available through internet access |
| 10 | All files available through internet access |
| 11 | Reserved |

FIG. 23

| Syntax | No.of Bits | Format |
|---|---|---|
| Internet_available_file_descriptor() { | | |
|     descriptor_tag | 8 | uimsbf |
|     descriptor_length | 8 | uimsbf |
|     num_internet_available_files | 8 | uimsbf |
|     for (i=0; i<num_internet_avilable_files; i++) { | | |
|         TOI | 32 | uimsbf |
|     } | | |
| } | | |

FIG. 24
| NRT Service Guide |||||
|---|---|---|---|---|
| 12/1 | 6:00 | 7:00 | | 8:00 |
| KBS | | Content Item 1 | | |
| MBC | Content Item 2 || Content Item 3 ||
| SBS | Content Item 4 ||| |
(a)
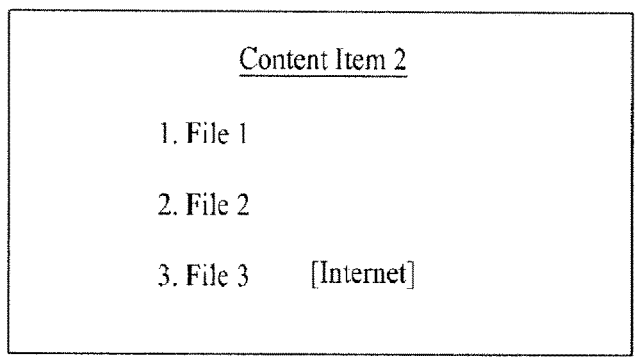
(b)
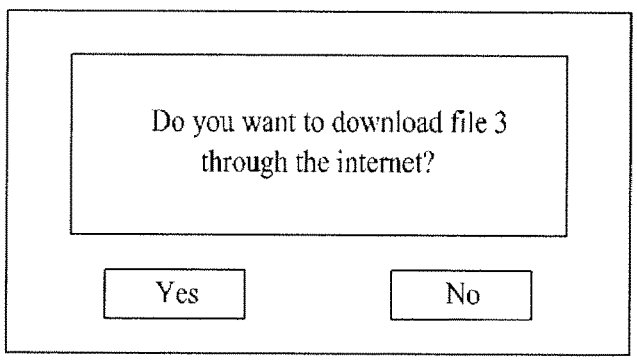
(c)

FIG. 25

| Content |
|---|
| id |
| version |
| validFrom |
| validTo |
| globalContentID |
| baseCID |
| ServiceReference |
|     idRef |
|     weight |
| Name |
| Description |
| StartTime |
| EndTime |
| AudioLanguage |
|     languageSDPTag |
| TextLanguage |
|     languageSDPTag |
| Length |
| ParentalRating |
|     ratingSystem |
|     ratingValueName |
| Genre |
| Extension |
|     url |
|     Description |
| PreviewDataReference |
|     idRef |
|     usage |
| PrivateExt |
|     AvailableOnInternet |
|     ContentEncoding |
|     ConentLinkage |
|     ContentType |
|     DescriptiveTags |
|     RequiredStorage |

METHOD OF PROCESSING NON-REAL TIME SERVICE AND BROADCAST RECEIVER

This application is a Continuation of U.S. patent application Ser. No. 12/654,080, filed on Dec. 9, 2009, which claims priority to U.S. Provisional Patent Application Nos. 61/121,178; 61/121,181; 61/138,494; 61/153,973; 61/153,985, 61/169,711; 61/226,259; 61/179,005 and 61/255,844, filed on Dec. 9, 2009, Dec. 9, 2008, Dec. 17, 2008, Feb. 20, 2009, Feb. 20, 2009, Apr. 15, 2009, May 17, 2009, Jul. 16, 2009 and Oct. 28, 2009, all of which are hereby incorporated by reference in their entirety as fully set forth herein.

BACKGROUND OF THE INVENTION

1. The Field

The present disclosure relates to a method for processing non-real time service and broadcast receiver thereof.

2. Description of the Related Art

A digital television (DTV) can provide video and audio services which are conventional TV services, but can also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the internet or data communication channels which enable bidirectional communication.

SUMMARY OF THE INVENTION

An object of the present invention is to provide a method of receiving and processing a non-real time service and a broadcast receiver thereof.

Another object of the present invention is to provide information indicating whether content in a non-real time service is available on the internet and the process of signaling the information and a broadcast receiver thereof.

Another object of the present invention is to provide a process of receiving files belonging to the content through the internet based on the signaled indication information and a broadcast receiver thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the objectives, according to an embodiment of the present invention, a method of processing a Non-Real Time (NRT) service in a broadcast receiver, the method includes receiving and processing a signaling information table including detail information of each content in the NRT service and indication information indicating whether the content is available on internet, acquiring internet access information of each file belonging to content available on the internet through File Delivery Table (FDT) of File Delivery over Unidirection Transport (FLUTE) based on the indication information, and downloading files belonging to the content by accessing the internet based on the acquired internet access information.

The indication information is included in the signaling information table as a field format.

The internet access information of each file belonging to the content available on the internet is acquired in a corresponding Content-Location attribute of FDT of the FLUTE.

Herein, each file belonging to the content not available on the internet is downloaded through an FLUTE session at a pre-determined time.

According to an embodiment of the present invention, a broadcast receiver includes a signaling information processor and a service manager (or NRT service manager). The signaling information processor receives and processes a signaling information table including detail information of each content in the NRT service and indication information indicating whether the content is available on internet. The service manager acquires internet access information of each file belonging to content available on the Internet through File Delivery Table (FDT) of File Delivery over Unidirection Transport (FLUTE) based on the indication information and downloads files belonging to the content by accessing the internet based on the acquired internet access information.

Other objects, features, and advantages of the present invention will be apparent through a detailed description of the embodiments with reference to the accompanying drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates an embodiment of a bit stream syntax structure of a virtual channel table according to the present invention;

FIG. 5 illustrates an embodiment of service type field values in the virtual channel table of FIG. 4 and respective meanings of the values;

FIG. 6 illustrates another embodiment of values allocated to a service type field in the virtual channel table of FIG. 4 and respective meanings of the values;

FIG. 7 illustrates an embodiment of a bit stream syntax structure of a data service table (DST) of the present invention;

FIG. 10 and FIG. 11 illustrate a bit stream syntax structure of a Non-Real Time Service Table (NST) according to the present invention;

FIG. 12 illustrates a bit stream syntax structure of a component_descriptor( ) according to the present invention;

FIG. 13 illustrates a bit stream syntax of FLUTE file delivery data using the component_descriptor( ) of FIG. 12;

FIG. 14 and FIG. 15 illustrate a bit stream syntax structure of a Non-Real Time Information Table (NRT-IT) according to an embodiment of the present invention;

FIG. 16 and FIG. 17 illustrate a FDT XML schema according to an embodiment of the present invention;

FIGS. 18 (a) and (b) illustrate a UI display in a broadcast receiver using service information table according to an embodiment of the present invention;

FIG. 20 and FIG. 21 illustrate a bit stream syntax structure of a Non-Real Time Information Table (NRT-IT) according to an embodiment of the present invention;

FIG. 22 illustrates value and the meaning of the value allocated to available_on_internet field according to an embodiment of the present invention;

FIG. 23 illustrates a bit stream syntax structure of Internet available file descriptor according to an embodiment of the present invention;

FIGS. 24 (a), (b), and (c) illustrate UI display of a broadcast receiver using service information table according to an embodiment of the present invention;

FIG. 25 illustrates a syntax structure of content fragment of OMA BCAST according to an embodiment of the present invention.

DESCRIPTION OF THE PREFERRED EMBODIMENTS

Figure 1:
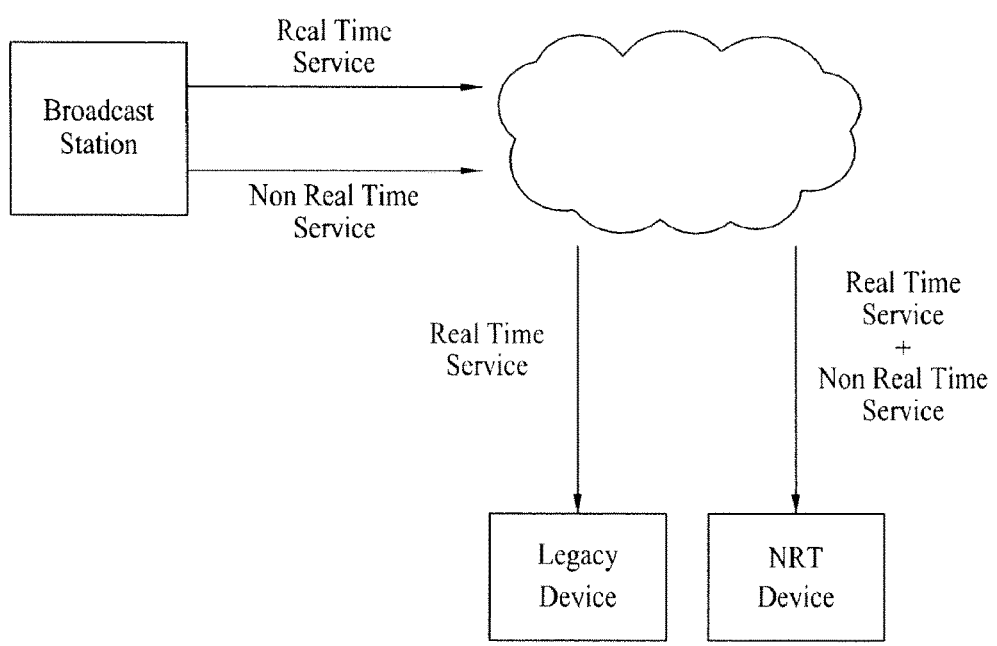
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT service. Thus, NRT service is not restricted in time. Further the data used in NRT service is referred to as NRT service data.

A broadcast receiver according to the present invention receives NRT service through terrestrial, cable, internet, and the like.

The NRT service is stored in the broadcast receiver and then it is displayed through a display according to a time specified by the user or at the user's request. The NRT service is received and stored in a file format according to an embodiment. In an embodiment, the storage is an internal HDD attached to the inside of the broadcast receiver. In another embodiment, the storage may be Universal Serial Bus (USB) memory or an external HDD connected externally with the broadcast receiving system.

In order to receive and store the files configuring the NRT service and provide service to the user, signaling information or NRT service signaling data according to the present invention.

An NRT service according to the present invention can be divided into Fixed NRT and Mobile NRT depending on the method of acquiring IP datagram. The Fixed NRT service is provided through fixed broadcast receiver and Mobile NRT service is provided through mobile (portable) broadcast receiver.

A Fixed NRT service is explained as an embodiment of the present invention. However, the present invention can obviously applied to Mobile NRT service as well.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. Therefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service many not only provide such news clips, weather information, advertisements, and push VOD, but may also provide specific clips and detailed information on specific program from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
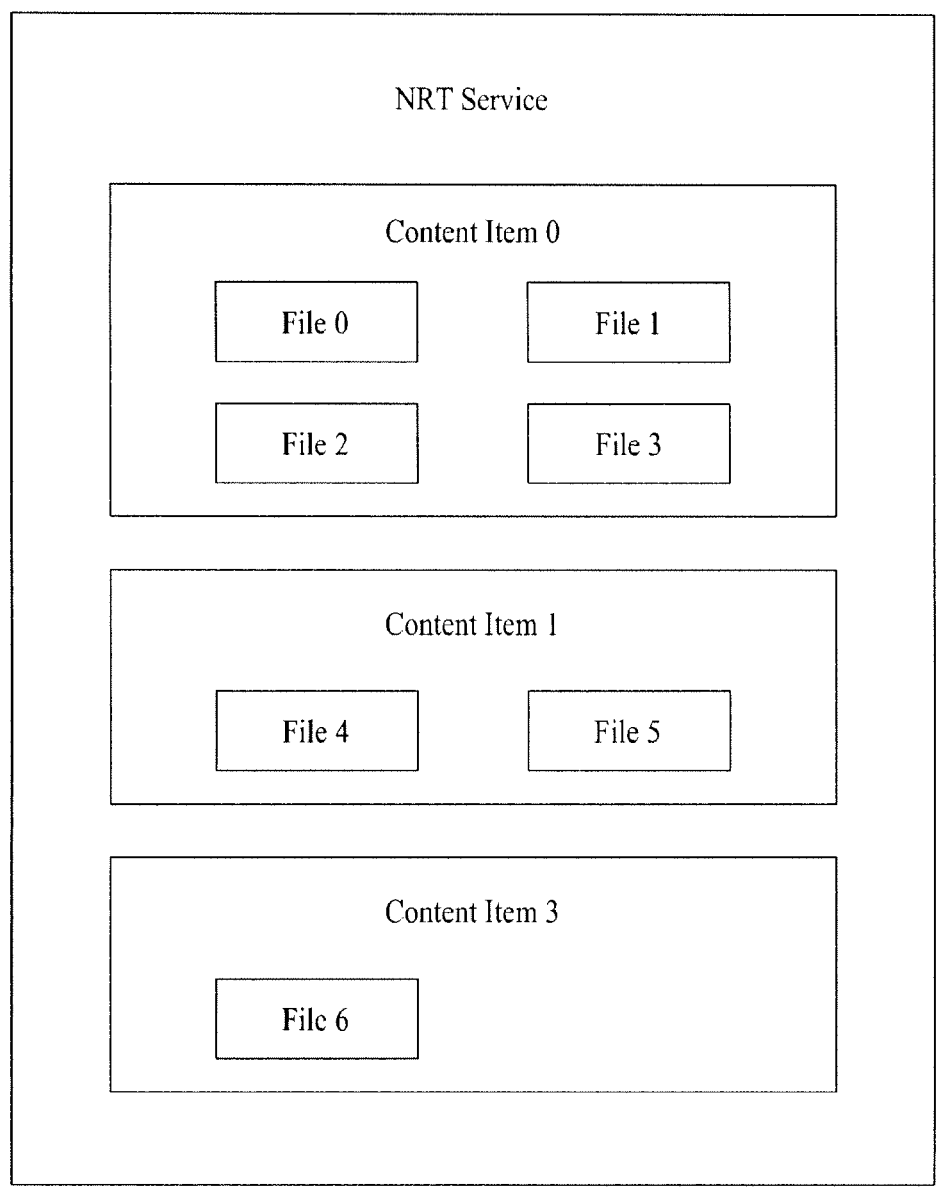
FIG. 2 is a diagram illustrating the relationship between an NRT service, content items, and files.

In an embodiment, one NRT service according to the present invention includes one or more content (or NRT content) and one content includes one or more files as shown in FIG. 2. The terms "file" and "object" have the same meaning in the description of the present invention.

The NRT content is the minimum unit that can be presented independently. For example, when a news program, which includes an economic news section, a political news section, and a life news section, is provided in non-real time, the news program may be an NRT service and each of the economic news section, the political news section, and the life news section may be the NRT content. And each of the economic news section, the political news section, and the life news section may include at least one file.

Here, the NRT service may be transmitted through the same broadcast channel as the RT service or through an exclusive broadcast channel in a MPEG-2 TS packetized format. In order to identify the NRT service, a unique PID is allocated in the TS packet of the NRT service data when transmitted. In an embodiment of the present invention, the IP based NRT service data is transmitted in MPEG-2 TS packetized format.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (or Service Table: NST) and NRT Information Table (NRT-IT). In an embodiment of the present invention, the NST provides the access information of at least one NRT service and at least one content item/file that forms NRT services that operate in the IP layer. In an embodiment, the access information of content item/files in the NRT-IT is provided. In the present invention, the NST and NRT-IT is referred to as signaling information table.

Figure 3:
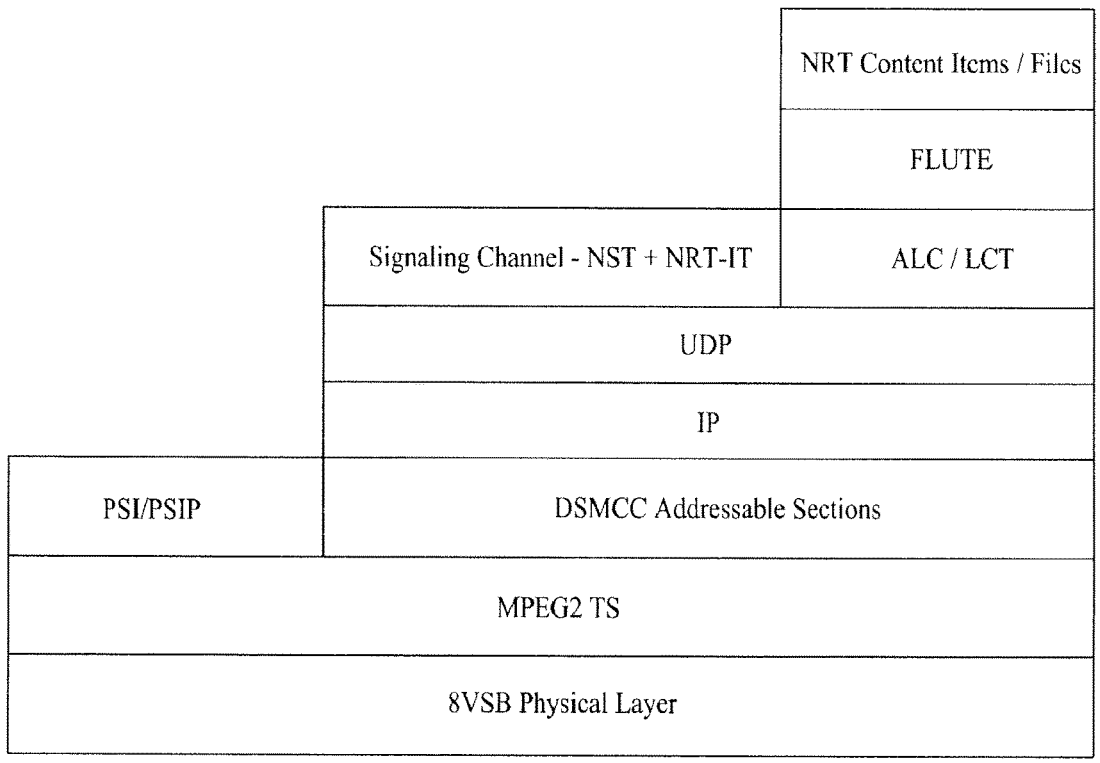
FIG. 3 illustrates an embodiment of a protocol stack for a fixed NRT service according to the present invention.

FIG. 3 illustrates a diagram for a protocol stack of an NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service and the identification information of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to a UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

FIG. 4 illustrates a syntax structure of the Virtual Channel Table (VCT) section according to an embodiment.

The VCT section, taking information about the virtual channel for example, transmits information of channel information for channel selection and PID information for receiving audio and/or video. Thus, when the VCT section is parsed, the PID of the audio and video of the broadcast program transmitted within the channel along with the channel number and channel name is known.

The VCT section syntax includes at least one of table_id field, section_syntax_indicator field, private_indicator field, section_length field, transport_stream_id field, version_number field, current_next_indicator field, section_number field, last_section_number field, protocol_version field, num_channels_in_section field.

The VCT section syntax further includes first 'for' loop (virtual channel loop) which repeats for the number indicated in the num_channels_in_section field value, the first loop includes at least one of short_name field, major_channel_number field, minor_channel_number field, modulation mode field, carrier_frequency field, channel_TSID field, program number field, ETM_location field, access_controlled field, hidden field, service_type field, source_id field, descriptor_length field, or second 'for' loop which repeats for the number of the descriptors included in the first loop. For the convenience of explanation in the present invention, the second loop is referred to as the first descriptor loop. The descriptor( ) included in the first descriptor loop is a descriptor applied in each virtual channel.

The VCT section syntax may further include a third 'for' loop which repeats for the number of value indicated by additional_descriptor_length field and the number of descriptor added in the VCT section. For the convenience of explanation in the present invention, the third loop is referred to as the second descriptor loop. The additional_descriptors( ) included in the second descriptor loop is applied to all the descriptors described in the virtual channel of the VCT section.

A table_id field illustrated in FIG. 4 indicates a unique identifier or identification (ID) which identifies that the information transmitted through the table is VCT. More specifically, the table_id field indicates a value informing that the table corresponding to this section is a VCT. For example, a 0xC8 value may be given to the table_id field.

A version_number field indicates the version number of the VCT, the section_number field indicates the number of this section, and the last_section_number field indicates the number of the last section of a complete VCT. The num_channels_in_section field designates the number of the overall virtual channel existing within the VCT section.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor_channel numbers, and the major and minor channel numbers are used as user reference numbers for the corresponding virtual channel.

A short_name field in the first 'for' loop indicates the name of a virtual channel. The major_channel_number field indicates a 'major' channel number associated with the virtual channel defined within the first loop and the minor_channel_number field indicates 'minor' channel number. Thus, each channel number should be connected to the major and minor channel numbers, and the major and minor channel numbers are used as user reference numbers for the corresponding virtual channel.

A service_type field indicates the service type within the corresponding virtual channel.

In an embodiment, the virtual channel may include at least one RT service and at least one NRT service including audio and/or video.

In this case, service type values may be allocated as shown in FIG. 5 and a value of 0x04 representing an ATSC-data-only service may be used to indicate that an NRT service is provided through the virtual channel.

In another embodiment, the virtual channel may only include one or more NRT service. In such a case, as shown in FIG. 6, a new service_type field value of 0x08 may be defined to indicate that an NRT service is provided through the virtual channel.

A source_id field indicates a program source connected to the corresponding virtual channel.

The term "source" refers to a specific source such as a video, text, data or audio source. The source_id field has a unique value in a transport stream in which a VCT is transmitted.

Meanwhile, data service table (DST) may be received through PID included in the service_location_descriptor of the VCT, and through the DST, the types of the application and the detailed information of the data broadcast stream transmitted through the channel is known.

In the present invention, NRT application (NRT service) is identified through the DST.

FIG. 7 illustrates the DST section syntax structure according to an embodiment.

An sdf_protocol_version field (8-bit) indicates the version of the Service Description Framework protocol.

An application_count_in_section field (8-bit) indicates the number of applications listed within the DST section.

A compatibility_descriptor( ) field indicates that the corresponding structure includes DSM-CC compatible descriptor. The object is to signal the compatibility requests of the application of the platform received to determine the ability to use the corresponding data service.

An app_id_byte_length field (16-bit) indicates the number of bytes used to identify the application.

An app_id_description field (16-bit) indicates the format and the semantics of the next application identification bytes. As described in the table 1 below, '0x0003' is newly assigned to identify that the corresponding application is an NRT application. The assigned value of '0x0003' is just an exemplary value and the scope of this application is not limited to the value.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004 - 0x7FFF | ATSC reserved |
| 0x8000 - 0xFFFF | User private |

An app_id_byte field (8-bit) describes the byte of the application identifier.

A tap_count field (8-bit) indicates the number of Tap( ) structure used by the corresponding application.

A protocol_encapsulation field (8-bit) indicates the type of the protocol encapsulation used to transmit the specific data element in reference with the Tap( ) field.

An action_type field (7-bit) indicates the character of the data in reference with the Tap( ) field.

A resource_location field (1-bit) indicates the location of the association_tag field that matches the association_tag value listed within the next Tap structure. If the value of the corresponding field is '0,' then the matching association_tag exist in the PMT of the current MPEG-2 program. Oppositely, if the value is '1,' then the matching association_tag exists in the DSM-CC Resource Descriptor in the Network Resources Table of the corresponding data service.

A Tap( ) field, for example, is defined in a unique structure including the following. The tap_id field (16-bit) is used by the application to identify the data elements. The range of the value of tap_id is determined by the app_id_byte fields related to Tap( ) within the DST. The value of tap_id is selected by the data service provider. Further, it is used in application to handle the data elements.

A Use field (16-bit) is used to specify the communication channel referenced by the association_tag.

An association_tag field (16-bit) uniquely identifies one from the listed DSM-CC resource descriptor within the Network Resource Table or listed data elementary stream within the PMT.

A Selector( ) field indicates a unique data element that can be used in the communication channel referenced by association_tag field or in the data elementary stream. The selector structure can indicate protocol requested for the corresponding data element.

A tap_info_length field (16-bit) indicates the number of bytes of the descriptors of the next field of the corresponding field.

A descriptor( ) field follows the descriptor format.

An app_info_length field (8-bit) indicates number of bytes of the descriptor of the next corresponding field.

A descriptor( ) field follows the descriptor format.

An app_data_length field (16-bit) indicates length of the app_data_byte fields in bytes.

An app_data_byte (8-bit) describes the private data fields different from input parameters associated with the application as 1 byte.

A service_info_length field (8-bit) indicates number of byte unit of the next descriptors.

A descriptor( ) field follows the descriptor format.

A service_private_data_length field (16-bit) indicates length of byte unit of the private fields.

A service_private_data_byte field (8-bit) describes the private fields as 1 byte.

Figure 8:
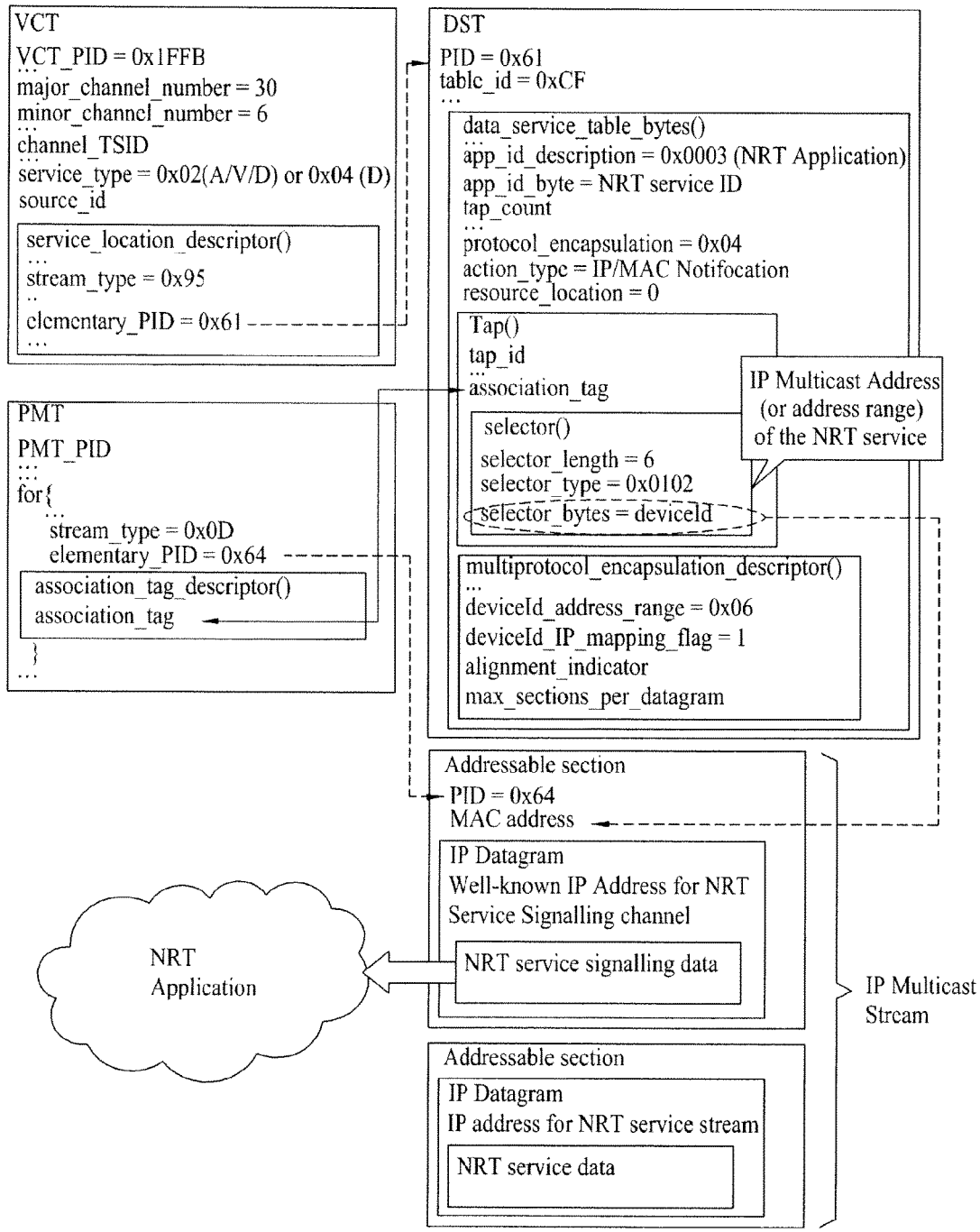
FIG. 8 illustrates an embodiment of a procedure for obtaining access information of an IP stream that carries an NRT service signaling channel using a PSI/PSIP table according to the present invention.

FIG. 8 illustrates a method in which an NRT service is received and provided using an ATSC A/90 standard for carrying (or transmitting) a data broadcast stream and an ATSC A/92 standard for transmitting an IP multicast stream in a broadcast receiver according to the present invention.

Namely, information of a stream that constitutes each virtual channel is signaled in an ES_loop of a PMT or a service location descriptor of a VCT. For example, an NRT service stream can be transmitted through the virtual channel in the case where the service type of the VCT is 0x02 (i.e., digital A/V Data), 0x04 (i.e., data only), or 0x08 (i.e., NRT only service), as shown in FIG. 5 or FIG. 6. At this time, when the stream_type field included in the service location descriptor (or the ES loop of the PMT) has a value allocated 0x95 (i.e., DST transmission), this indicates that a data broadcast is transmitted. A normal A/V is transmitted if the service location descriptor has no value for stream_type field or does not have a value of 0x95 allocated. Therefore, if the stream_type field included in the service location descriptor has a value of 0x95, the Elementary_PID field value is a PID of a Data Service Table (DST). Thus, the DST can be received through the Elementary_PID field.

The type of the application and details of a data broadcast stream transmitted through this channel can be determined through the DST. In the present invention, an NRT application (i.e., an NRT service) is identified using the DST.

That is, an App_id_description field of the DST specifies the format and analysis of application identification bytes subsequent to this field. In an embodiment of the present invention, '0x0003' is allocated to the App_id_description field in order to identify the NRT application. The illustrated value (number) is only an example and does not limit the scope of the present invention.

If the App_id_description field value is '0x0003', an Application_id_byte value subsequent to this field is a service ID of the NRT application. A service ID of the NRT application may have a Uniform Resource Identifier (URI) value that globally and uniquely identifies the corresponding service.

After the NRT application is identified as described above, a PID of an MPEG-2 TS packet separated from the IP datagram of the NRT service signaling channel is located through the Tap information. Then, an IP datagram that carries the NRT service signaling channel can be obtained from MPEG-2 TS packets having the PID found through the tap information and NRT service signaling data can be obtained from the obtained IP datagram. Here, well-known IP access information, i.e., a well-known IP address and a well-known UDP port number can be used as the IP access information of the NRT service signaling channel.

That is, an asynchronous IP stream is transmitted if a Protocol_encapsulation field value in the DST is 0x04 and a device_id value indicating the destination address is transmitted through a selector_bytes value if a Selector_type field value is 0x0102. A multiprotocol_encapsulation_descriptor is used in order to accurately analyze the selector_bytes value and signals the number of valid bytes included in the device_id value. As a result, an IP multicast addresses (or address range) of the NRT service signaling channel transmitted through the PID can be determined through the Tap information.

Accordingly, the IP multicast address (or address range) is accessed and an IP stream, i.e., an IP packet, is received and NRT service signaling data is extracted from the received IP packet.

The extracted NRT service signaling data includes NRT service data (NRT content item/files) and can store in a storage or display in a display device.

In another embodiment of the present invention, the NRT service can be signaled using a new value, for example, 0x96 instead of 0x95 as the stream type field value of the DST. This embodiment aims to eliminate the risk that the conventional receiver may malfunction with the NRT service which is a new application, in the case where the conventional receiver operates by determining whether or not a data broadcast stream is present based only on whether or not a stream having a stream type value of 0x95 is present. In this case, if a new stream type is defined, it will be possible to allow the conventional receiver to ignore this stream type, thereby guaranteeing backward compatibility.

Figure 9:
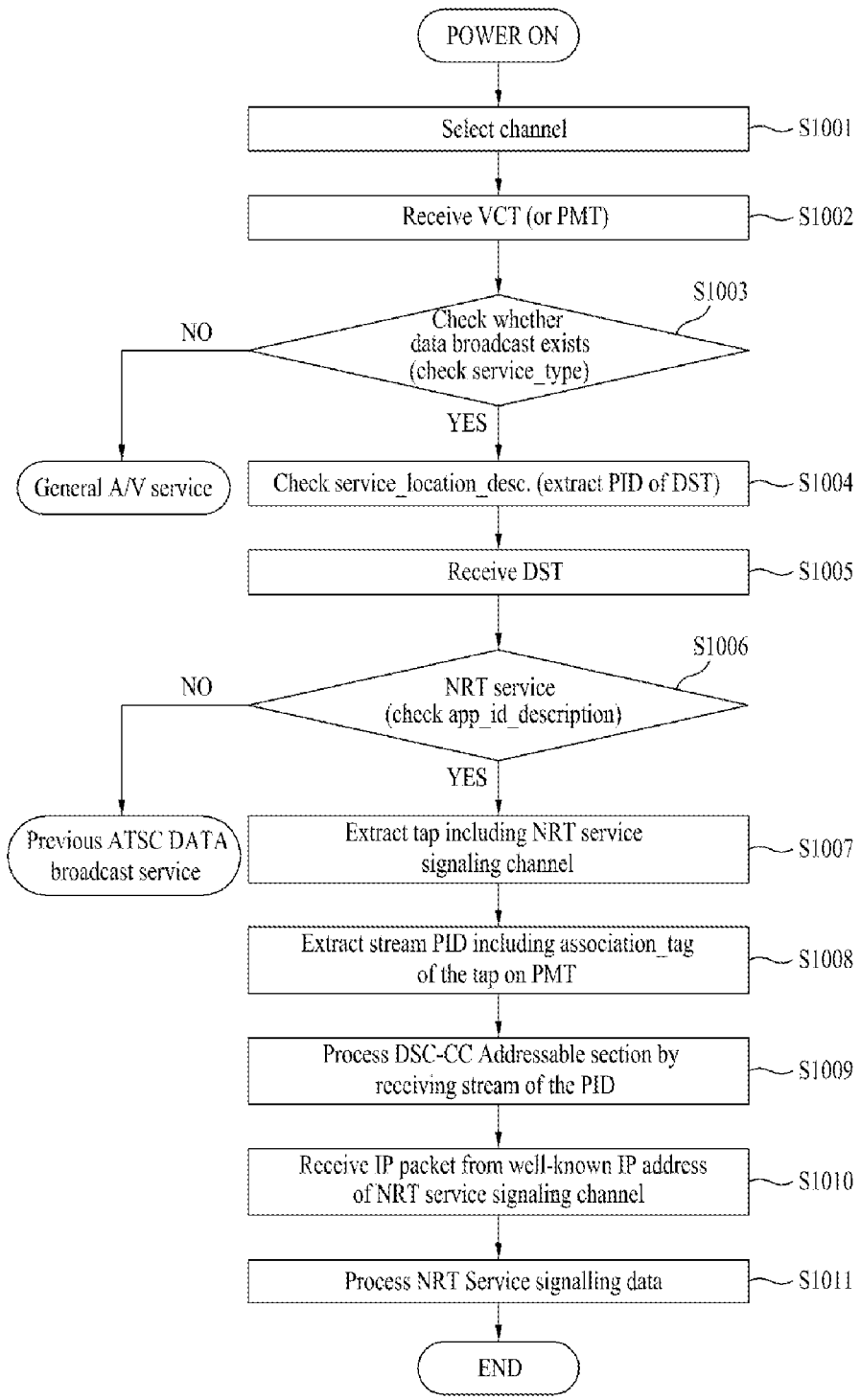
FIG. 9 is a flowchart illustrating a procedure for obtaining access information of an IP stream that carries an NRT service signaling channel using a PSI/PSIP table according to an embodiment of the present invention.

FIG. 9 is a flowchart illustrating the process of NRT service signaling data and the process of extracting the NRT service data.

In an embodiment, as shown in FIG. 9, the service_type field in the VCT has a value of 0x08 as in FIG. 6, indicating that at least one NRT service is transmitted through the relevant virtual channel.

After a power of a receiver has been turned on, if a default channel or a channel by a user is selected [S1001], the receiver receives a VCT or a PMT [S1002]. And then the receiver determines whether NRT service exists or not by parsing the VCT [S1003]. This can be done through looking at the service_type in the received virtual channel loop within the VCT. The [S1001] step is processed in the tuner and the [S1002]/[S1003] step is processed in the PSI/PSIP section handler.

For instance, if a value of the service_type is not set to '0x08', the relevant virtual channel will not transmit NRT service. The virtual channel will then transmit conventional service (i.e., legacy ATSC service), the receiver processes according to the information included in the virtual channel.

If the service_type field has a value of 0x08, the virtual channel will transmit NRT service. In such a case, service location descriptor in the virtual channel of the VCT is parsed to extract the PID of DST [S1004]. Then, using the extracted PID, DST is received [S1005]. The [S1004] and [S1005] step is processed through the demultiplexer controlled by the service manager.

It is then determined whether the corresponding service provided on the selected channel is an NRT service from the received DST [S1006].

The determination of a presence of the NRT service can be performed by checking the value of the App_id_description field.

For instance, the value of the App_id_description is set to '0x0003,' in this present invention to identify that the service is an NRT application (i.e., NRT service). The value (number) is only an example and will not limit the scope of the present invention.

If the value of the App_id_description field is '0x0003,' the value of the subsequent Application_id_byte becomes the value of service ID of the NRT application (i.e., NRT service). As a result of identifying the NRT application, a Tap is extracted to locate the PID of the MPEG-2 TS packet separated from the IP datagram of the NRT service signaling channel [S1007]. And, elementary stream PID including association_tag of the Tap is extracted from the PMT [S1008]. The steps of to [S1008] are processed by the service manager or the PSI/PSIP section handler.

After receiving and decapsulating the MPEG-2 TS packets corresponding to the stream PID, i.e., removing the MPEG-2 header, a DSM-CC addressable section is recovered [S1009]. This process is handled by the addressable section handler.

Subsequently, after removing section header and CRC checksum from the DSM-CC addressable section, IP datagram transmitting the NRT service signaling channel is recovered [S1010], and the NRT service signaling data is obtained from the recovered IP datagram [S1011]. At this time, the access information of the IP datagram transmitting the NRT service signaling channel is received from a well-known destination IP address and well-known destination UDP port number.

If a value of Protocol_encapsulation in the DST is set to '0x04', an asynchronous IP datagram is transferred. If Selector_type is set to '0x0102', a value of device_id indicating a destination address is delivered via selector_bytes. In order to accurately analyze the value of the selector_bytes, multiprotocol_encapsulation_descriptor is used and the number of the valid byte within the device_id is signaled. As a result, the IP Multicast address (or address range) of the NRT service signaling channel transmitted through PID of the Tap information is known.

Thus, by accessing the IP Multicast address (or address range), IP stream, i.e., IP packet is received, and the NRT service signaling data is extracted from the IP packet.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

The NST provides access information of the NRT service. In one embodiment NST has a similar table format as the MPEG-2 Private section type.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 10 and FIG. 11 illustrate a bitstream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 10 and FIG. 11, a table_id field includes an 8-bit unsigned integer number that indicates the type of table section being defined in NRT Service Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number is an 8-bit field that shall give the section number of this NST section. The section_number of the first section in an NST shall be '0x00'. The section_number shall be incremented by 1 with each additional section in the NST.

A last_section_number is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id is a 16-bit unsigned integer number that shall uniquely identify this NRT service within the scope of this NRT section. The NRT_service_id of a service shall not change throughout the life of the service. To avoid confusion, it is recommended that if a service is terminated, then the NRT_service_id for the service should not be used for another service until after a suitable interval of time has elapsed.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator is a 1-bit field that indicates when set to 1, service protection is applied to at least one of the components needed to provide a meaningful presentation of this NRT Service.

A Short_NRT_service_name_length field (3-bit) instructs the number of byte pairs within the Short NRT service_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in this NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a Boolean flag that indicates, when set to '1', that an NRT_service_destination_IP_address value is present, to serve as the default IP address for the components of this NRT Service.

A source_IP_address is a 32 or a 128 bit field that shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address is a 32 or a 128 bit field that shall be present if the NRT_service_destination_IP_address_flag is set to '1' and shall not be present if the NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE session.

An essential_component_indicator field is a one-bit indicator which, when set to '1', shall indicate that this component is an essential component for the NRT Service. Otherwise, this field indicates that this component is an optional component.

A port_num_count is a 6-bit field that shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field (32 or 128 bit) shall be present if the component_destination_IP_address_flag is set to and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address_field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 12 illustrates an embodiment of a bitstream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 12, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 then NRT_component_data (component_type) field provides component data for H.264/AVC video stream.

In another example, if the component_type field value is 38 then NRT_component_data (component_type) field provides data for FLUTE file delivery as shown in FIG. 13.

One NRT service can be included in multiple FLUTE sessions. Thus, one NRT service may be configured with plurality of FLUTE sessions. Each FLUTE session may be signaled using NRT_component_data( ) as shown in FIG. 13.

FIG. 13 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIA's bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

As an example, each file including content items can be identified by using the Content-Location described in FDT of FLUTE session. The Content-Location is an identifier identifying the corresponding file and is in any Uniform Resource Identifier (URI). Thus, the Content-Location value is the location identifier including the file name.

The content linkage identifying the corresponding content items in file level or instance level of FDT can be allocated. In such a case, each file can be identified by using content linkage, TOI, and Content-Location value described in FDT of FLUTE session. Here, the content linkage is an identifier identifying the content item and Transfer Object Identifier (TOI) is an identifier identifying file, transport object transmitted through FLUTE session. For example, if the TOI value is 0, that file is FDT. Thus TOI value of each file included in the content items has a value greater than 0.

According to the present invention, one NRT service includes one or more content item (or content or NRT content) as illustrated in FIG. 2, and one content item includes one or more file.

Further files included in the content item are provided to NRT through FLUTE session. However, the files included in the content item can be provided through not only FLUTE session, but also through the internet. Thus, content item included in NRT service is all provided through FLUTE session and at least one file in the content item can be provided through the internet.

In an embodiment of the present invention, information regarding whether content item is provided through the internet can be signaled in a field format in the signaling information table. For ease of explanation, the information field is referred to as available_on_internet field.

The signaling information table includes NST and NRT-IT, and in the present invention available_on_internet field is allocated in the NRT-IT, and whether the content item is provided through the internet is indicated in the available_on_internet field.

Further, according to an embodiment of the present invention, if the content item can be provided through the internet, the Content_Location attribute in FLUTE FDT that corresponds to each file in the content item, includes Internet address of that file.

NRT Information Table (NRT-IT)

FIGS. 14 and 15 illustrate a bit stream syntax of NRT-IT section that includes the detailed information of the content according to the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

In the present invention, the NRT-IT in the NRT service signaling data includes information describing the downloadable content item needed to store the content item in the broadcast receiver. The information provided in the NRT IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays. The NRT-IT is used to provide information for virtual channels of service_type values 0x08.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of NRT_service_id available on a particular virtual channel sometime during the time period it covers.

Using the table_id field, section_number field, last_section_number field in NRT-IT, it is possible to find out whether one NRT-IT includes one section or plurality of sections. Further, after deleting the IP header and the UDP header of the IP datagrams of the NRT service signaling channel and gather the sections having the same table identifier, the corresponding table is completed. For example, gathering the sections having table identifier allocated in NRT-IT, an NRT-IT is completed.

The detailed description of the NRT-IT section fields illustrated in FIGS. 14 and 15 are described below.

A Table_id field (8-bit) is set to 0xTBD to identify this table section as belonging to the Non-Real-Time Information Table.

An NRT_service_id field (16-bit) specifies the NRT_service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for NRT_service_id field, current_next_indicator field, protocol_version field, and time_span_start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and timespan length field are set such that the specified time span does not overlap with any other NRT-IT instance in this IP subnet.

A num_items_in_section field (8-bit) indicates the number of content items described in this NRT-IT section.

The 'for' loop (also referred to as item loop) is executed for number of content items corresponding to the field value of the num_items_in_section and provides signaling information about plurality of content items. Thus, the signaling information of the content item of each content item included in the NRT service corresponding to the NRT_service_id field value is indicated. The following describes the field in each content item that may provide the information.

A content_linkage field (32-bit) in the range 0x0001 to 0xFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

An updates_available field (1-bit) specifies, when set to '1,' that the referenced content item(s) will be updated. When the updates_available field is set to '0,' updates are not expected to be provided for the associated content item(s), and broadcast receivers are not expected to look for them.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

An available_on_internet field (1-bit) indicates whether the corresponding content item is provided through the internet. Thus, it indicates whether files of the corresponding content item can also be accessed through the internet. For example, if the content item is provided through the internet, the available_on_internet field value is set to '1,' and if it is not provided through the internet, the value is set to '0.' Here, when the available_on_internet field value is '1,' the URI value of the files in FLUTE FDT of set content item includes the internet address. In other words, Content-Location attribute in FLUTE FDT corresponding to each file in the content item indicates the internet Uniform Resource Locator (URL) of the file.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor ( ) that provide additional information about the content level.

A content_descriptor( ) is separately applied to each content item.

A descriptors_length field (10-bit) indicates the total length (in bytes) of the descriptor ( ).

A descriptor( ) is commonly applied to all content items described in the current NRT-IT section.

Thus, if the value of available_on_internet field in content item loop of the NRT-IT is set to '1' in a broadcast receiver, in order for the set content item to be provided through internet an internet access information for each file is needed.

According to the present invention, Content_Location attribute of each file in FLUTE FDT of content item that are set to '1' as a value of available_on_internet field in content item loop of the NRT-IT, includes Internet address of the corresponding file.

FIG. 16 and FIG. 17 illustrates a schema of FDT eXtensible Markup Language (XML) according to an embodiment of the present invention.

According to FIG. 16 and FIG. 17, when there is a need to commonly define an attribute for all fields declared in FDT (or FDT instance), it is defined in FDT instance level, and if there is a need to define attributes for each file individually, it is defined in the FDT file level.

The underlined part indicated as 1 in FIG. 16 is a declaration made in the content linkage of FDT instance level and the declared content linkage is authorized to all files in the corresponding FDT instance. It is possible to newly authorize content linkage in the File level to override the information. Also, if a specific file is not a content item defined in the FDT instance level and is in a different content item, this fact can be indicated by authorizing content linkage in the file level.

The underlined part indicated as 2 indicates that the content linkage is declared in File level and if the file included in FDT instance is associated with different content item with each other, signaling is done to indicate where each file is associated in which content item using this method.

The underlined part indicated as 3 in FIG. 17 is a method of indicating whether the corresponding file of each file is an entry file. Entry file means that it is played first from many files included in content item or it is a first file that has to be executed (root file) in order to access the content item. Entry attribute can be omitted, and the default value is false, where if it is omitted then it indicates that the corresponding file is not an entry file.

As illustrated, by signaling entry indication according to the group that a file is associated in the File level, a specific file can perform as an entry in a specific group and not perform as an entry in a different group.

In the File level indicated as 2 as explained, one file element can provide additional information using one or more attributes. In FIG. 16 and FIG. 17, one file element uses Content-Location, TOI, Content-Length, Transfer-Length, Content-Type, Content-Encoding, Content-MD5, FEC-OTI-FEC-Encoding-ID, FEC-OTI-FEC-Instance-ID, FEC-OTI-Maximum-Source-Block-Length, FEC-OTI-Encoding-Symbol-Length, FEC-OTI-Max-Number-of-Encoding-Symbols attributes to provide location of the file, TOI, length, information, type information, and encoding information of the corresponding file.

If file element in FIG. 16 and FIG. 17 is associated with content item that can be provided through the internet, Content-Location attribute value must include internet address as indicated as 4. For example, Content-Location attribute in FLUTE FDT corresponding to each file associated with the content item indicates internet URL of the file. Thus, in this case, Content-Location attribute limits the file type to 'Internet URL.'

According to an embodiment of the present invention, if the value of available_on_internet field in content item of NRT-IT of a broadcast receiver is set to '1,' then a user is to be notified that the corresponding content item can be provided through the internet. Further, user may select whether to receive the content item through the internet or through the FLUTE session to download in NRT.

FIGS. 18 (*a*) and (*b*) illustrate User Interface (UI) display using the service information table such as NST and NRT-IT of a broadcast receiver according to an embodiment of the present invention.

FIG. 18 (*a*) illustrates an NRT service guide display using NST and NRT-IT.

FIG. 18 (*a*) is an embodiment displaying the NRT service guide display in content item unit. In a different example, service guide display may be displayed in NRT service unit.

In an embodiment, content items 1, 2, 3, and 4 of FIG. 18 (*a*) uses names that a user can easily recognize.

Here, if the content item has a value of '1' as its available_on_internet field, a text or an icon may be located next (or above or below) to the content item name to indicate that the content item can be provided through the internet. Also, color can be used to indicate that the content item is available through the internet. In FIG. 18 (*a*), an example is shown to illustrate that content item 2 can be provided through the internet.

In a service guide display illustrated in FIG. 18 (*a*), if a user uses input devices such as remote control, keyboard, mouse, or touch, instructs by clicking the text or an icon to download the content item 2 indicating that it is possible to download through the Internet, the corresponding files are downloaded by immediately accessing the internet. FIG. 18 (*b*) is a display indicating such message.

FIG. 18 (*b*) illustrates a display to display the menu button indicating message such as "Do you want to, receive content item 2 through the internet?" and 'yes,' 'no' for selection.

Here, when a user, using input devices such as remote control, keyboard, mouse, or touch, selects 'yes' button in the menu, access information of files included in the content item 2 is described and reads URI value of the files of FLUTE FDT. For example, if there are 3 files included in the content item 2, the URI value of the 3 files includes each corresponding Internet URL. Thus, the internet URL value of the corresponding files in the FLUTE FDT can be known by reading Content-Location attribute.

Then, 3 files associated with content item 2 are directly downloaded by accessing the internet using each internet URL value of the 3 files associated with content item 2. At this point, before the files of the content item 2 starts to download or after the files are downloaded, user may select to display (or execute) or store the content item. The content item may be displayed (or executed) right after the download, or can be stored in storage and can be displayed (or executed) upon user request.

For example, assume that content item 1 is political news, content item 2 is living news, and content item 3 is economy news. And assume that living news includes 3 files. In this case the internet URL value of the 3 files included in the living news is acquired through Content-Location attribute of the corresponding file of FLUTE FDT. If the user selects to execute immediately, the 3 files are downloaded and the living news is immediately executed. If the user selects to store, the living news is stored in storage and executed later upon the user request.

As described, when the content item is provided through the internet, the content item can be downloaded and executed in real time. For example, if the current time is 9 am, and the available download time through NRT for living news provided by FLUTE session is 10 pm, then through accessing the internet, it is possible to view the living news even at 9 am. In other words, it is possible to download living news without having to wait until 10 pm.

If the user selects 'no' from the menu display illustrated in FIG. 18 (*b*), the 3 files included in living news is downloaded at 10 pm through the corresponding FLUTE session and stored in storage.

At this point, before downloading the selected content item, which is the living news, the user can select to download, display (or execute), or store. Therefore, when the download of the living news is completed, it can be immediately displayed (or executed), or the living news can be downloaded and stored in storage, and be displayed (or executed) upon user request.

Further a text, an icon, or a color may indicate next (or a part of the display) to the living news in the content item, to indicate whether the living news is pre-download, currently downloading, or finished downloading. For example, assuming that icons are used to indicate the status of the download, and when the icon for finished downloading appears, by clicking the icon, the living news is immediately executed.

Until now, the explanations assumed that the broadcast receiver was capable of receiving both internet and NRT service.

However, if the broadcast receiver does not support Internet, even if the value of available_on_internet field in the content item of content item 2 is '1,' the content item 2 cannot be provided through the Internet.

In such a case, the text or icon besides the content item name indicating that the content item can be provided through the internet is inactivated. Therefore, even if the user clicks the text or icon, the content item 2 cannot be downloaded or executed since there is no access to the internet. The user may be notified by displaying an error message in such a case. For example, a message such as 'This broadcast does not have access to the internet' can be displayed as an error message.

Figure 19:
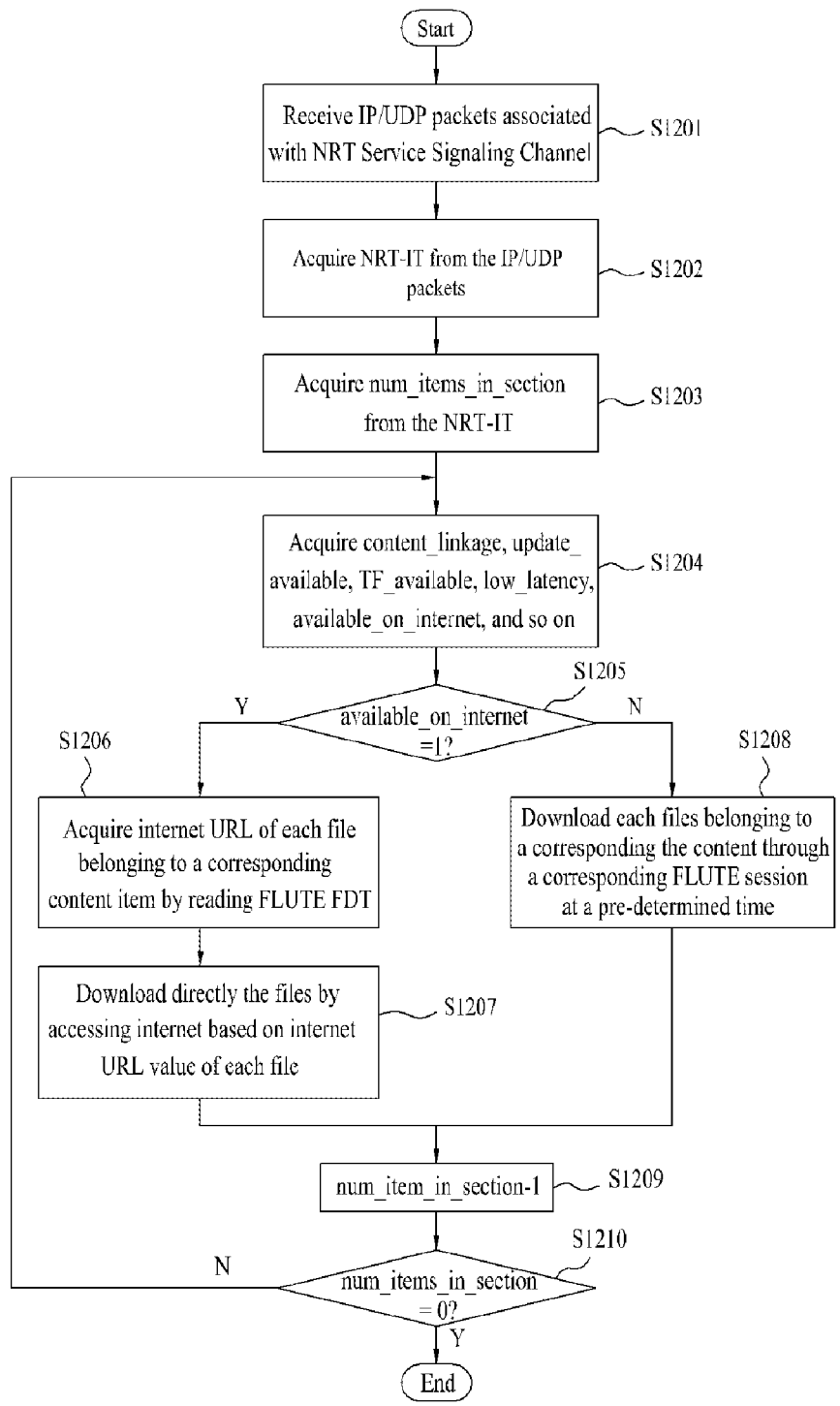
FIG. 19 is a flowchart illustrating the process of an NRT service using NRT-IT section in a broadcast receiver according to an embodiment of the present invention.

FIG. 19 is a flowchart illustrating a process of handling a non-real time service in a broadcast receiver using an NRT-IT section.

First, IP/UDP packets associated with NRT service signaling channel are received [S1201]. Then NRT-IT section is acquired from the received IP/UDP packets and each fields are analyzed [S1202]. The IP datagrams of NST and NRT-IT section included in the NRT service signaling channel have the same well-known IP address and well-known UDP port number. Therefore, the classification of NRT-IT section included in the NRT service signaling channel is performed by the table identifier.

Then, the number of items (num_items_in_section) described in the NRT-IT section from the NRT-IT section are acquired [S1203]. The process after [S1203] is repeatedly executed for the number of content items acquired to gather detail information of the content by each content item and whether the content item can be provided through the internet, and the operation is performed according to the acquired information.

Thus, identifier for the content item (content_linkage), update availability (updates_available), TF availability (TF_available), latency capability (low_latency), availability of internet (available_on_internet) of each content item is acquired. If the available_on_internet value is '1,' then it indicates that the files in the content item can also be downloaded through accessing the internet.

Therefore, based on the value of available_on_internet field acquired in [S1204] the files included in the content item can be directly downloaded from the internet or by NRT through the FLUTE session at a pre-selected time.

If the value of the available_on_internet field acquired from [S1204] indicates that the content item can be provided through the internet, internet URL value for each file included in the content item is acquired through reading the FLUTE FDT [S1206]. Here, the internet URL value can be acquired from Content-Location attribute of each file included in the content item of the FLUTE FDT.

Then, based on the Internet URL value of each file, the files are directly downloaded by accessing the internet [S1207]. Before downloading the files, the user can be notified that the content item is provided through the internet by indicating through a text or an icon. Further, the user can select to display (or execute) or store the content item before download starts or after finishing downloading. Thus, when downloading the files are completed the content item may be immediately displayed (or executed) or stored in storage to be displayed upon user request.

If the value of available_on_internet field acquired from [S1204] indicates that the content item is not provided through the Internet, the files associated with the content item are downloaded and stored in storage through the FLUTE session at a pre-determined time [S1208]. Thus, the files in the content item are downloaded through the broadcast network. Here, before the files are downloaded, whether to download, to display (or execute), or store can be selected by the user. Therefore, when the files in the content item are downloaded, it can be immediately displayed (or executed), or it can be stored in storage and be displayed (or executed) upon user request.

When the steps [S1207] or [S1208] are executed and determined whether to download the content item through the internet or through the FLUTE session, from [S1203], the acquired num_items_in_section field value, 1 is subtracted [S1209], and check whether num_items_in_section field value is [S1210]. If the num_items_in_section field value is not 0, then [S1204] is executed again to determine the download of next content item. If the num_items_in_section field value from [S1210] is 0, then the download of content item included in the NRT-IT has all been determined and the content item process is completed.

Meanwhile, assuming that one content item includes plurality of files, all files associated with the content item can be provided through the internet, some file can be provided through the internet, or all files cannot be provided through the internet.

According to an embodiment of the present invention, 2-bit is allocated to the value of available_on_internet field in NRT-IT, and each status of the content item can be classified.

FIG. 20 and FIG. 21 illustrate a bit stream syntax structure of NRT-IT section including available_on_internet field indicating whether files associated with content item can be provided through the internet according to an embodiment of the present invention.

In FIG. 20 and FIG. 21, the fields excluding available_on_Internet field in NRT-IT was explained with reference to FIG. 14 and FIG. 15, so the detail explanation is omitted.

In FIG. 20 and FIG. 21, an available_on_internet field (2-bit) in content item loop of NRT-IT, indicates whether the files associated with the content item can all be downloaded, some of the files can be downloaded, or no files can be downloaded through the internet.

FIG. 22 illustrates the value and the meaning of the value allocated to available_on_internet field according to an embodiment of the present invention.

For example, if the available_on_internet field value is '00,' then it indicates that there are no files associated with the content item that can be downloaded through the internet. In such a case, the files in the content item are downloaded in NRT through FLUTE session.

If the available_on_internet field value is '01,' then some of the files in the content item can be downloaded through the internet.

If the available_on_internet field value is '10,' then all files in the content item can be downloaded through the internet. When the available_on_internet field value is '10,' the explanation with reference to FIG. 16 to FIG. 19 applies according to an embodiment.

In FIG. 22, the values allocated to the available_on_internet field are embodiments to explain the present invention, therefore the meanings included in the available_on_internet field can be added or deleted upon the person skilled in art, and the present invention does not limit to the embodiments.

If the available_on_internet field value is 01, then a broadcast receiver must know which files in the content item can be provided through the Internet in order to access the internet to download the corresponding file.

According to an embodiment of the present invention, information of files in the content item that are available through the internet can be signaled as a descriptor format in the content item loop. In the present invention, for ease of explanation, the descriptor is referred to internet_available_file_descriptor( ). Thus, the internet_available_file_descriptor( ) is provided as one of content level descriptor of NRT-IT.

FIG. 23 illustrates a bit stream syntax structure of internet_available_file_descriptor( ) according to an embodiment of the present invention.

The explanation of each field of the internet_available_file_descriptor( ) is as follows.

A descriptor_tag field (8-bit) is a descriptor identifier which can be set as an identifier to identify internet_available_file_descriptor( ).

A descriptor_length field (8-bit) indicates the length of the descriptor from after the descriptor_length field to the end of this descriptor in bytes.

A num_internet_available_files field (8-bit) indicates the number of files in the content item that can be provided through the internet.

Depending on the num_internet_available_files field value, the 'for' loop (or Internet available file loop) is executed to provide identification information of each file available to be downloaded through the Internet.

TOI field is included in the Internet available file loop in order to execute the above process.

The TOI field (32-bit) indicates the file identifier transmitting through FLUTE session.

The files matching with the TOI field value can also be accessed through the internet. Further, the internet URL value of the file as illustrated in FIG. 16 and FIG. 17, can be acquired from Content-Location attribute of the file corresponding to same TOI attribute in FLUTE FDT.

If some files from files included in one content item can be downloaded through the Internet, internet access information of the files available through the Internet is needed. In such case, an embodiment of the present invention allows Content-Location attribute in FLUTE FDT corresponding to each file available for download through the internet indicates the internet URL value of the file. Thus, the Content-Location attribute limits the file type to 'Internet URL.'

A broadcast receiver according to an embodiment of the present invention can notify the user whether the content item or the file is available through the internet depending on the value of available_on_internet field in content item of NRT-IT. Further the user can select to download a specific content item.

If the available_on_internet field value is '00' or '10,' the explanation is referenced to FIG. 16 to FIG. 19 and it is omitted here.

If the available_on_internet field value is '01,' then the files available through the internet can be pre-downloaded and stored in storage through accessing the internet, and the rest of the files not available on the internet may be downloaded and stored in storage through FLUTE session at a pre-determined time. Also, all the files associated with the content item can be downloaded and stored in storage through FLUTE FDT session at a pre-determined time.

FIG. 24. (a) to (c) illustrate a UI display in a broadcast receiver using service information table such as an NST or NRT-IT according to an embodiment of the present invention.

In FIG. 24 (a), an example of NRT service guide display is illustrated using NST and NRT-IT.

FIG. 24 (a) is an example where NRT service guide display is displayed in content item unit. In another example, service guide display can be displayed in NRT service unit.

According to an embodiment, content item 1,2,3, and 4 of FIG. 24 (a) can be displayed in a name that can be easily identified by the user.

As an example of illustrating a specific content item from the service guide display of FIG. 24 (a), if content item 2 is selected, the list of files included in selected content item 2 is displayed.

FIG. 24 (b) illustrates an example where 3 files (1, 2, and 3) are included in content item 2 and the display of the files.

In the present invention, file 3 included in content item 2 is assumed to be available through the internet. In an embodiment, next to the name of file 3 (above or below, etc), using a text or an icon, an indication that the file is available on the internet can be provided. A color can also be used to indicate that the file is available on the internet.

The user, through input devices such as remote control, keyboard, mouse, touch, and the like, can click the text or icon next to the name of file 3 indicating that the file is available on the internet to display a menu display illustrated in FIG. 24 (c).

FIG. 24 (c) is an example to displays a message 'Do you want to download file 3 through the internet' and a 'yes', 'no' menu button in a display.

When the user, uses remote control, keyboard, mouse, touch or the like input devices, select 'yes' from the menu, URI value of FLUTE FDT corresponding to the file 3 is read. In other words, internet URL value of the file 3 is known by reading Content-Location attribute of file 3 in FLUTE FDT.

Then file 3 can be directly downloaded by accessing the internet through the internet URL value of file 3.

If the user select 'no' from the menu in FIG. 24 (c), file is downloaded and stored in storage through the FLUTE session with files 1 and 2 at a pre-determined time.

The explanation up until now was focused on handling content item and/or file applied to a Fixed NRT service. The present invention can be applied to Mobile NRT service as well.

According to the present invention, the signaling information table for Mobile NRT service is a Service Map Table (SMT).

The SMT provides access information of component (or content item) included in each services of real time service or non-real time service of mobile broadcast. The SMT is a signaling information table that corresponds to NST of Fixed NRT service. If a service included in the mobile broadcast is an NRT service, then signaling information including access information of FLUTE session transmitting content item/files of NRT service can be extracted from the SMT. The detail information of content items included in the NRT service can be extracted from OMA BOAST Service Guide (SG). Thus, in an embodiment, Service Map Table (SMT) and OMA BOAST SG can be used to for signaling Mobile NRT service.

According to the present invention, allocating "AvailableOnInternet" element, which is a Boolen-value, in PrivateExt region of SG content fragment of OMA BOAST in Mobile NRT service is an embodiment. The "AvailableOnInternet" element corresponds to available_on_internet field of Fexed NRT service and it has the same semantics.

FIG. 25 illustrates an example of allocating "AvailableOnInternet" element in SG content fragment of OMA BOAST according to an embodiment of the present invention. The "AvailableOnInternet" element is included in the PrivateExt region of SG content fragment. The "AvailableOnInternet" element can be described as AvailableOnInternetType. The AvailableOnInternetType has a boolean for its restriction base according to an embodiment. The AvailableOnInternetType has simpleType as a name for AvailableOnInternetType.

In Mobile NRT, whether content item can be provided through the internet can be determined using "AvailableOnInternet" element allocated in SG content fragment of OMA BCAST.

If "AvailableOnInternet" element indicates that the content item can also be provided through the internet, the Content-Location attribute in FLUTE FDT corresponding to each file of the content item indicates internet URL of the file. Thus, the Content-Location attribute limits the file type to 'Internet URL.'

Further, in an embodiment of the present invention, if the mobile broadcast receiver indicates that the content item can also be provided through the internet by "AvailableOnInternet" element, the user knows about such feature. In addition, in an embodiment, the user can select to download the content item through the internet or by NRT through FLUTE session. Also, the explanation not provided in mobile NRT service follows the explanation made with reference to FIG. 16 to FIG. 19.

Figure 26:
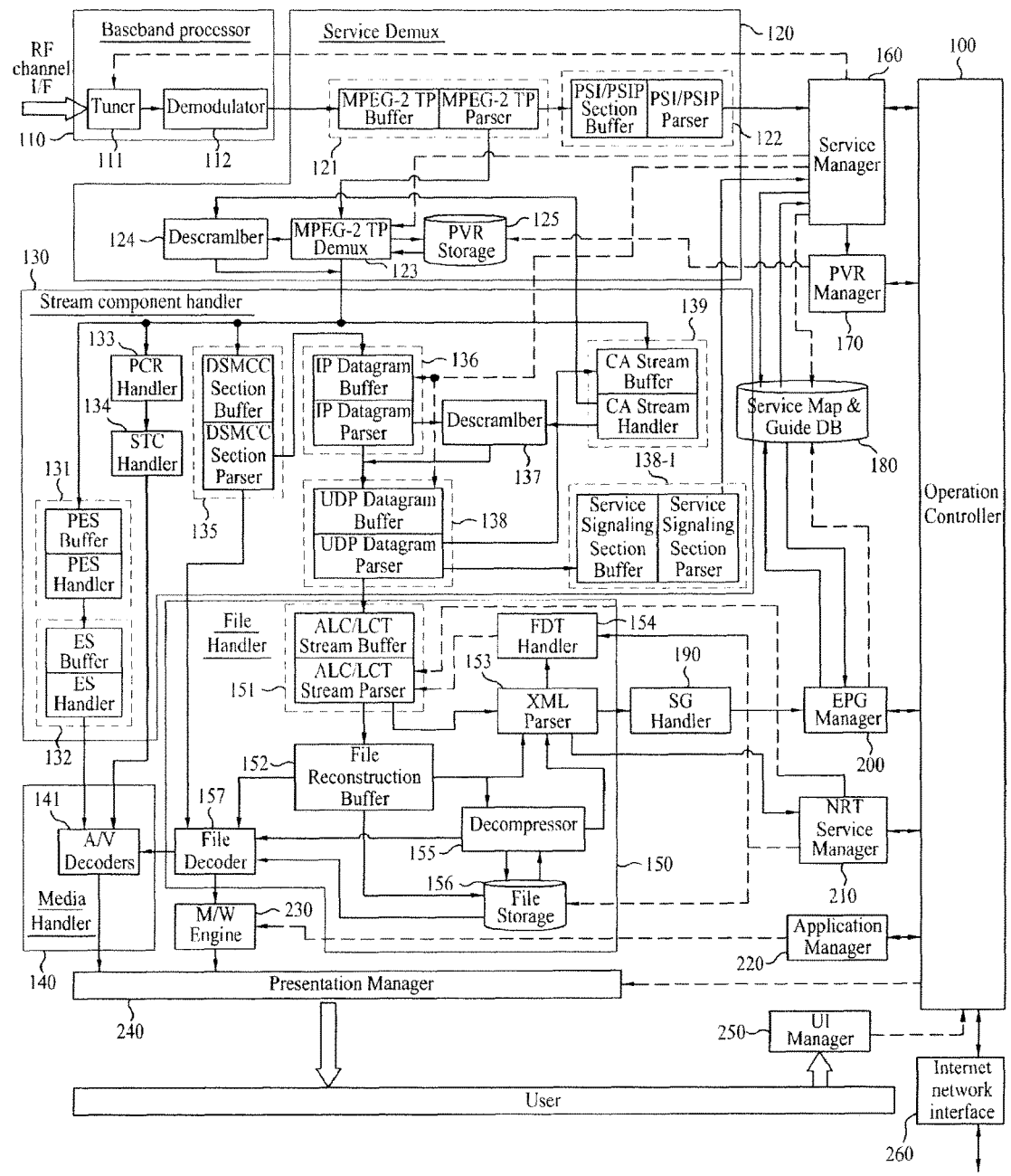
FIG. 26 is a block diagram illustrating a broadcast receiver that provides an NRT service according to an embodiment of the present invention.

FIG. 26 is a block diagram of a broadcast receiver for a Fixed NRT service according to an embodiment of the present invention.

The broadcast receiver in FIG. 17 includes Operation Controller 100, Baseband processor 110, Service Demux 120, Stream component handler 130, Media Handler 140, File Handler 150, Service Manager 160, PVR Manager 170, Service Map & Guide DB (First Storage Unit) 180, SG Handler 190, EPG Manager 200, NRT Service Manager 210, Application Manager 220, MiddleWare Engine 230, Presentation Manager 240, and UI Manager 250.

The Baseband processor 110 includes Tuner 111 and Demodulator 112. The Service Demux 120 includes MPEG-2 TP Handler 121, PSI/PSIP Handler 122, MPEG-2 TP Demux 123, Descrambler 124 and Second Storage Unit (PVR Storage) 125.

The Stream component handler 130 includes Packetized Elementary Stream (PES) decoder 131, Elementary Stream (ES) decoder 132, PCR Handler 133, STC Handler 134, DSM-CC Addressable Section Handler 135, IP Datagram Handler 136, Descrambler 137, UDP Handler 138, Service Signaling Section Handler 138-1, and Conditional Access System (CAS) 139.

The Media Handler 140 includes A/V Decoders 141. The File Handler 150 includes ALC/LCT Stream Handler 151, File Reconstruction Buffer 152, XML Parser 153, FDT Handler 154, Decompressor 155, Third Storage Unit (File Storage) 156, and File Decoder 157.

The Tuner 111 for example in FIG. 26 detects signal transmitted over the terrestrial system with the control from the Service Manager 160 and tunes only the wanted channel, down converts to Intermediate Frequency (IF), and outputs to Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to MPEG-2 TP Handler 121 in a MPEG-2 Transport Stream (TS) packet format.

The MPEG-2 TP Handler 121 is configured of MPEG-2 TP Buffer and MPEG-2 TP Parser, temporarily stores the Demodulator 112 output and then analyzes TS Header, and outputs to MPEG-2 TP Demux 123 if the Demodulator 112 output is a real time A/V TS packet or NRT TS packet and outputs to PSI/PSIP Handler 122 if the output is a TS packet for PSI/PSIP table.

The PSI/PSIP Handler 122 is configured of PSI/PSIP Section Buffer and PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by Service Manager 160 and then stored in First Storage Unit 180. The VCT, PMT, DST, EIT, ETT, and the like, are stored in Map & Guide DB 180 after going through the process. The Service Manager 160 stores the table information in the First Storage Unit 180 in the Service Map & Guide DB format.

The MPEG-2 TP Demux 123 divides audio TS packet and video TS packet and then outputs to PES Decoder 131 if the TS packet is real time A/V TS packet and outputs to DSM-CC Handler 135 if it is an NRT TS packet. Also, the MPEG-2 TP Demux 123 outputs to PCR Handler 133 if the TS packet includes Program Clock Reference (PCR) and outputs to CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using DST and PMT.

The MPEG-2 TP Demux 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The MPEG-2 TP Demux 123 stores A/V packet of real time from any one of the record, timed-record, or time shift request in the Second Storage Unit 125. The Second Storage Unit 125 is a mass storage device, an example of it can be a HDD. The download (storage) and upload (playing) in the Second Storage Unit 125 is controlled by the PVR Manager 170.

The MPEG-2 TP Demux 123 outputs to PES Decoder 131 by dividing the audio TS packet and video TS packet from the uploaded A/V TS packet of the Second Storage Unit 125.

The MPEG-2 TP Demux 123, in order to perform such functions, is controlled by Service Manager 160 and/or PVR Manager 170.

Thus the Service Manager 160 receives DST by extracting the PID of the DST from the service location descriptor (or ES loop of PMT) of the VCT when the service_type field value indicates that NRT service is transmitted.

Further, NRT service is identified through the received DST, and extracts DST and PMT by using the PID of MPEG-2 TS including NRT service signaling channel. The extracted PID is outputted to the MPEG-2 TP Demux 123. The MPEG-2 TP Demux 123 outputs to Addressable Section Handler 135 the MPEG-2 TS packets corresponding to PID outputted by the Service Manager 160.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to A/V Decoder 141 reconstructed System Time Clock (STC) which is the standard clock from the system by the PCR.

The PES Decoder 131 is configured with PES Buffer and PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with ES Buffer and ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with Stream Buffer and CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descrambler 124, 137.

The DSM-CC Section Handler 135 is configured with DSM-CC Section Buffer and DSM-CC Section Parser, temporarily stores the TS packet outputted from the MPEG-2 TS Demux 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with IP Datagram Buffer and IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to CAS 139 and if it is NRT service signaling data, then it is outputted to service signaling section handler 138-1, and if it is NRT service data then it is outputted to ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to Service Signaling Section Handler 138-1.

The Service Signaling Section Handler 138-1 is configured with Service Signaling Section Buffer and Service Signaling Section Parser, and outputs to Service Manager 160 the reconstructed and parsed NRT-IT received from the NRT Service Signaling Data such as the NST illustrated in FIG. 10 and FIG. 11, and the NRT-IT illustrated in FIG. 14 and FIG. 15. The access information of the FLUTE session transmitting content/files configuring NRT service is acquired when the NST is parsed. The NST and the parsed information from the NRT-IT are gathered by the Service Manager 160 and stored in First Storage Unit 180. The Service Manager 160 stores extracted information from the NST and NRT-IT in the First Storage Unit 180 in Service Map & Guide format. In another embodiment, the role of the Service Manager 160 can also be performed by the Service Manager 210. Thus the parsed information from the NST and NRT-IT is gathered by the NRT Service Manager 210 and stored in the First Storage Unit 180.

Moreover, when the user requests a service guide display through the UI Manager 250, the Service Manager 160 or the NRT Service Manager 210 under the control of Operation Controller 100, uses the stored information in the First Storage Unit 180 configures service guide including at least one of RT service and NRT service, and displays on a display through the Service Guide Presentation Manager 240.

As an example, a service guide display as illustrated in FIG. 18(a) can be displayed in content item unit.

If the Service Manager 160 or NRT Service Manager 210 indicates by showing a text or an icon next to the content item name to indicate that the content item can be provided through the internet when there is content item that can be provided through the internet. FIG. 18(a) is an example showing that content item 2 can be provided through the internet.

The Service Manager 160 or NRT Service Manager 210 reads the value of available_on_internet field in the content item loop of NRT-IT that signals detail information of content item to check which content item can be provided through the internet.

In an embodiment, Content-Location attribute in FLUTE FDT corresponding to each file in the content item provided through the internet indicates the internet URL of the file. In such a case, Content-Location attribute limits the file type to 'Internet URL.'

The user can use the input devices such as remote control, menu screen, touch, or the like to click the text or icon next to the name of content item 2 indicating that it is possible to access through the internet, the selected signal is provided to Operation Controller 100 through UI Manager 250.

With the control of the Operation Controller 100, the NRT Service Manager 210 acquires Internet URL of each file from Content-Location attribute in FLUTE FDT corresponding to each file in content item 2 handled in XML Parser 153. Based on the acquired internet URL of each file, files in content item 2 are directly downloaded through accessing the internet through Internet Network Interface 260.

Here, the user may select to display (or execute) or store the content item before or after the download of the content item 2. When download is completed, by operating File Decoder 157, Middleware (M/W) Engine 230, Presentation Manager 240, can display (or execute) the content item immediately or store in Third Storage Unit 156 and display (or execute) upon user request. For example, using an input device, by clicking a text or an icon next to a name of the content item 2 which indicates that it is available on the Internet, a selection message shown in FIG. 18 (b) can be displayed. The internet is accessed only when 'yes' selected from the button menu.

As illustrated in FIG. 18 (a), if the content item that is not available on the internet is selected from the guide display, the Service Manager 160 or the NRT Service Manager 210 downloads the files associated with the selected content through FLUTE session at a pre-determined time and then stores in Third Storage Unit 156. Here, the user also may select to download (to execute) or store the content item before or after the download. When download is completed, by operating File Decoder 157, Middleware Engine 230, Presentation Manager 240, the content item can be immediately displayed (or executed), or stored in Third Storage Unit 156 and then displayed (or executed) upon user request.

The ALC/LCT stream handler 151 is formed with ALC/LCT stream buffer and ALC/LCT stream parser and buffers the ALC/LCT configuration data outputted by the UDP datagram handler 138 and after buffering, analyzes the ALC/LCT session header and header extension of the buffered data. From the analyzed ALC/LCT session header and header extension, if the data transmitted through ALC/LCT session is in XML structure, it outputs to XML Parser 153, and if it is a file structure, it temporary stores in File Reconstruction Buffer 152 and then outputs to File Decoder 157 or stores in Third Storage Unit 156. The ALC/LCT stream handler 151 gets control of the NRT service manager 210 if the data transmitted through ALC/LCT session is for data for NRT service. At this point, if the data transmitted through ALC/LCT session is compressed, it is decompressed in the Decompressor 155 and then outputted to at least one of XML Parser 153, File Decoder 157, and Third Storage Unit 156.

The XML Parser 153 analyzes the XML data transmitted through the ALC/LCT session, and outputs the analyzed data to FDT Handler 154 if the analyzed data is a file based service, and if it is data for service guide, then it outputs to SG Handler 190.

The FDT Handler 154 analyzes and handles File Description Table of the FLUTE protocol through the ALC/LCT session. The FDT Handler 154 gets control by the NRT Service Manager 210 if the file received by the FDT Handler 154 is for file for the NRT service.

The SG Handler 190 gathers, analyzes and outputs to EPG Manager 200 the data for service guide transmitted in XML structure.

In an embodiment, the File Decoder 157 outputs to A/V Decoder 141 or the Middleware Engine 230 after decoding in pre-selected algorithm files uploaded from the Third Storage Unit 156, file outputted from the Decompressor 155, or file outputted from the Reconstruction Buffer 152.

The Middleware Engine 230 analyzes and executes data or application. And using the Application Presentation Manager 240, it can be outputted to output device such as screen or speaker. In an embodiment the Middleware Engine 230 is a JAVA based Middleware Engine.

The EPG Manager 200 outputs to Presentation Manager 240 after converting to display the service guide data inputted from the SG Handler 190 according to the user input.

The Service Manager 160 stores in Second Storage Unit 125 service map made by analyzing and gathering NRT service signaling data transmitted through PSI/PSIP Table data or NRT service signaling channel. Also, the Service Manager 160 controls the access information about the NRT service the users wants and also controls the Tuner 111, Demodulator 112, and the IP Datagram Handler 136.

The Operation Controller 100 controls at least one of the Service Manager 160, PVR Manager 170, EPG Manager 200, NRT Service Manager 210, Application Manager 220, and Presentation Manager 240 according to the inputted user command through the UI Manager 250.

The NRT Service Manager 210 manages the NRT service in general transmitted in content/file format through FLUTE session in the IP layer.

The UI Manager 250 transmits user input through the UI to the Operation Controller 100.

The Presentation Manager 240 provides user through the speaker or the screen at least one of the outputted audio and video data from the A/V Decoder 141, file data outputted from the Middleware Engine 230, and service guide data outputted from the EPG Manager 210.

As described, the present invention indicates whether the content item in content item loop of NRT-IT signaling detail information of content items included in NRT service is provided through the internet, and acquire Content-Location attribute of the file of FLUTE FDT which indicates the internet URL value of each file in the content item provided through the internet. In doing so, bandwidth can be conserved because Internet URL of each file in the content item available through the Internet does not have to be directly signaled in NRT-IT.

The present invention is not limited to the above embodiments and it will be apparent to those skilled in the art that various modifications can be made to in the present invention as can be seen from the appended claims and such modifications are included in the scope of the invention.

What is claimed is:

1. A method of transmitting a non-real time service, the method comprising:
    generating, by a generator, a broadcast signal which carries internet protocol (IP) datagrams, the IP datagrams containing the non-real time service that is delivered in advance of its use and stored in a receiving device, first signaling data which includes service category information identifying the non-real time service, and second signaling data; and transmitting, by a transmitter, the broadcast signal, wherein the non-real time service is associated with one or more content items, each of which consists of one or more files, the one or more files being delivered based on LCT protocol, wherein each of the delivery sessions includes one or more LCT channels, wherein all of the LCT channels in each of the delivery sessions have a same IP address and numbered user datagram protocol (UDP) ports signaled in the second signaling data, and wherein the first signaling data includes information for acquiring service guide information, the service guide information announcing content and service being delivered.

2. The method of claim 1, wherein one delivery session of the delivery sessions transmits a description table that includes a transfer object identifier (TOI) identifying a transport object which includes a file transmitted through the delivery session, content location information identifying a location of the file and content linkage information linking with the content fragment included in the first signaling information.

3. The method of claim 2, wherein the content fragment of the first signaling information includes a content linkage element mapping the content linkage information included in the description table to identify that the one or more files carried on the delivery session belong to content items for the non-real time service.

4. The method of claim 3, wherein the IP datagrams further include the second signaling data which contains service-level attributes for the non-real time service; service.

5. The method of claim 4, wherein the second signaling data includes first information indicating that a category of a service is a non-real time service.

6. The method of claim 5, wherein the second signaling data further includes second information containing not only IP addresses and UDP ports but also transport session identifiers (TSIs) of the delivery sessions.

7. The method of claim 6, wherein each file associated with the content item represented by the content fragment has a tag in the description table, the tag matching a value of the information which is included in the content fragment.

8. The method of claim 7, wherein the description table includes information indicating an attribute that identifies the file as an entry point of the content item identified by the parameter, the entry point is presented initially the file of the content item by the receiving device.

9. An apparatus of transmitting a non-real time service, the apparatus comprising:

a generator configured to generate internet protocol (IP) datagrams, the IP datagrams containing the non-real time service that is delivered in advance of its use and stored in a receiving device, first signaling data which includes service category information identifying the non-real time service, and second signaling data; and a transmitter configured to transmit the broadcast signal containing the generated IP datagrams, wherein the non-real time service is associated with one or more content items, each of which consists of one or more files, the one or more files being delivered based on LCT protocol, wherein each of the delivery sessions includes one or more LCT channels, wherein all of the LCT channels in each of the delivery sessions have a same IP address and numbered user datagram protocol (UDP) ports signaled in the second signaling data, and wherein the first signaling data includes information for acquiring service guide information, the service guide information announcing content and service being delivered.

10. The apparatus of claim 9, wherein one delivery session of the delivery sessions transmits a description table that includes a transfer object identifier (TOI) identifying a transport object which includes a file transmitted through the delivery session, content location information identifying a location of the file and content linkage information linking with the content fragment included in the first signaling information.

11. The apparatus of claim 10, wherein the content fragment of the first signaling information includes a content linkage element mapping the content linkage information included in the description table to identify that the one or more files carried on the delivery session belong to content items for the non-real time service.

12. The apparatus of claim 11, wherein the IP datagrams further include the second signaling data which contains service-level attributes for the non-real time service.

13. The apparatus of claim 12, wherein the second signaling data includes first information indicating that a category of a service is a non-real time service.

14. The apparatus of claim 13, wherein the second signaling data further includes second information containing not only IP addresses and UDP ports but also transport session identifiers (TSIs) of the delivery sessions.

15. The apparatus of claim 14, wherein each file associated with the content item represented by the content fragment has a tag in the description table, the tag matching a value of the information which is included in the content fragment.

16. The apparatus of claim 15, wherein the generator further generates information indicating an attribute that identifies the file as an entry point of the content item identified by the parameter, the entry point is presented initially the file of the content item by the receiving device from the description table.

* * * * *